(12) United States Patent
Sudak et al.

(10) Patent No.: US 11,523,449 B2
(45) Date of Patent: Dec. 6, 2022

(54) WIDEBAND HYBRID ACCESS FOR LOW LATENCY AUDIO

(71) Applicant: APPLE INC., Cupertino, CA (US)

(72) Inventors: Eran Sudak, Herzliya (IL); Moshe Penso, Herzliya (IL)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 16/144,245

(22) Filed: Sep. 27, 2018

(65) Prior Publication Data

US 2020/0107380 A1 Apr. 2, 2020

(51) Int. Cl.
*H04W 76/14* (2018.01)
*H04W 74/08* (2009.01)
*H04L 12/28* (2006.01)
*H04W 72/04* (2009.01)

(52) U.S. Cl.
CPC ......... *H04W 76/14* (2018.02); *H04L 12/2803* (2013.01); *H04W 72/0446* (2013.01); *H04W 74/085* (2013.01); *H04L 2012/2849* (2013.01)

(58) Field of Classification Search
USPC ...................................................... 370/329
See application file for complete search history.

(56) References Cited

U.S. PATENT DOCUMENTS

| | | | | |
|---|---|---|---|---|
| 2004/0039575 A1* | 2/2004 | Bum | ................. | G06F 21/78 704/500 |
| 2004/0181403 A1* | 9/2004 | Hsu | ................. | G10L 19/025 704/E19.012 |
| 2005/0289586 A1* | 12/2005 | Park | ................. | H04H 60/13 725/31 |
| 2006/0206582 A1* | 9/2006 | Finn | ................. | H04L 63/10 709/217 |
| 2008/0075029 A1* | 3/2008 | Song | ................. | H04L 45/123 370/311 |
| 2010/0142461 A1* | 6/2010 | Miki | ................. | H04L 5/0092 370/329 |
| 2011/0060835 A1* | 3/2011 | Dorso | ................. | H04L 65/1069 709/227 |
| 2014/0303984 A1* | 10/2014 | Johnson | .......... | G11B 20/10527 704/500 |
| 2015/0071153 A1* | 3/2015 | Hong | ................. | H04L 5/0023 370/311 |
| 2018/0091634 A1* | 3/2018 | Mobasher | ........... | H04N 7/0255 |
| 2019/0104424 A1* | 4/2019 | Hariharan | ............... | H04R 3/12 |

* cited by examiner

*Primary Examiner* — Gregory B Sefcheck
*Assistant Examiner* — Majid Esmaeilian
(74) *Attorney, Agent, or Firm* — Fay Kaplun & Marcin, LLP

(57) ABSTRACT

A method for a communication protocol that includes wideband access for low latency audio. A source device and a sink device establish a wireless communication link. The protocol for communicating via the wireless communication link includes a frame having a first deterministic portion and a second opportunistic portion. The source device transmits during the first deterministic portion of the frame, first data to the sink device. The source device determines whether a predetermined condition associated with the wireless communication link is satisfied. When the predetermined condition is satisfied, the source device transmits, during the second opportunistic portion of the frame, second data to the sink device.

19 Claims, 4 Drawing Sheets

WIDEBAND HYBRID ACCESS FOR LOW LATENCY AUDIO

BACKGROUND

An electronic device may be configured with a variety of different wireless communication capabilities. For example, a first electronic device may be capable of exchanging data with a second electronic device over a transmission medium. The exchange of data between the two electronic device over a transmission medium may be enabled by a communication protocol.

SUMMARY

According to an exemplary embodiment, a method may be performed by a source device. The method includes establishing a wireless communication link with a sink device. The protocol for communicating via the wireless communication link includes a frame having a first deterministic portion and a second opportunistic portion. The method further includes, transmitting, during the first deterministic portion of the frame, first data to the sink device. The method further includes, determining whether a predetermined condition associated with the wireless communication link is satisfied. When the predetermined condition is satisfied, transmitting, during the second opportunistic portion of the frame, second data to the sink device.

According to another exemplary embodiment, a source device includes a transceiver configured to establish a wireless communication link with a sink device. The protocol for communicating via the wireless communication link includes a frame having a first deterministic portion and a second opportunistic portion. The source device further includes, a processor configured to transmit, during the first deterministic portion of the frame, first data to the sink device. The processor further configured to determine whether a predetermined condition associated with the wireless communication link is satisfied. When the predetermined condition is satisfied, the processor is configured to transmit, during the second opportunistic portion of the frame, second data to the sink device.

According to a further exemplary embodiment, an integrated circuit includes circuitry configured to establish a wireless communication link with a sink device. The protocol for communicating via the wireless communication link defines a frame having a first deterministic portion and a second opportunistic portion. The integrated circuit further includes, circuitry configured to transmit, during the first deterministic portion of the frame, first data to the sink device. The integrated circuit further includes, circuitry configured to determine whether a predetermined condition associated with the wireless communication link is satisfied. The integrated circuit further includes, circuitry configured to transmit second data to the sink device during the opportunistic portion of the frame when the predetermined condition is satisfied.

DETAILED DESCRIPTION

Figure 1:
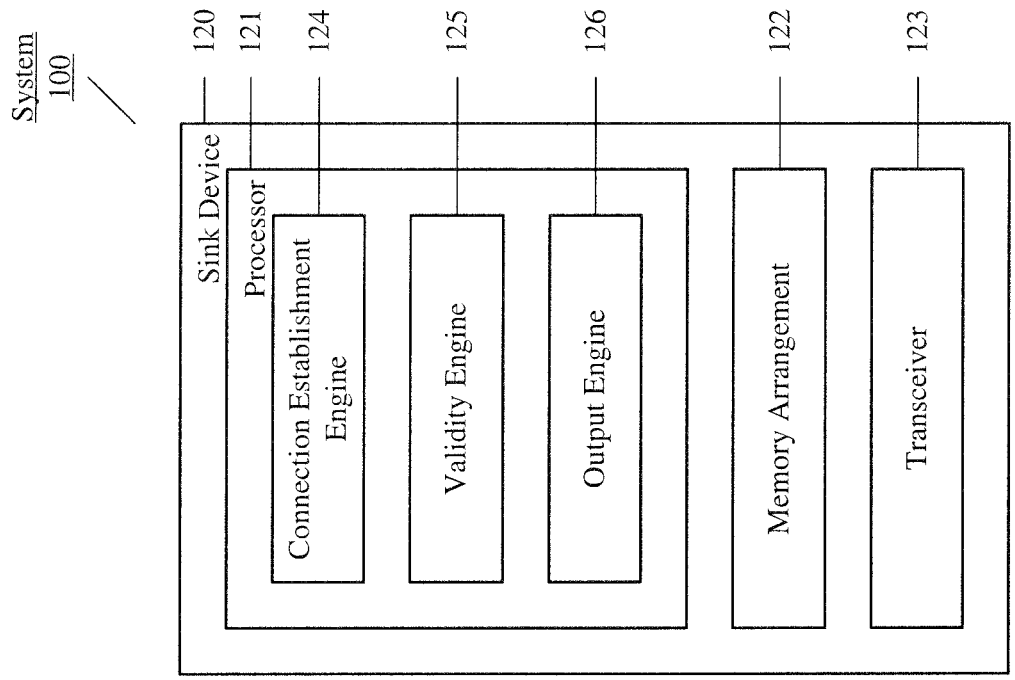
FIG. 1 shows an exemplary system where a source device exchanges data with a sink device according to various exemplary embodiments.
Figure 1:
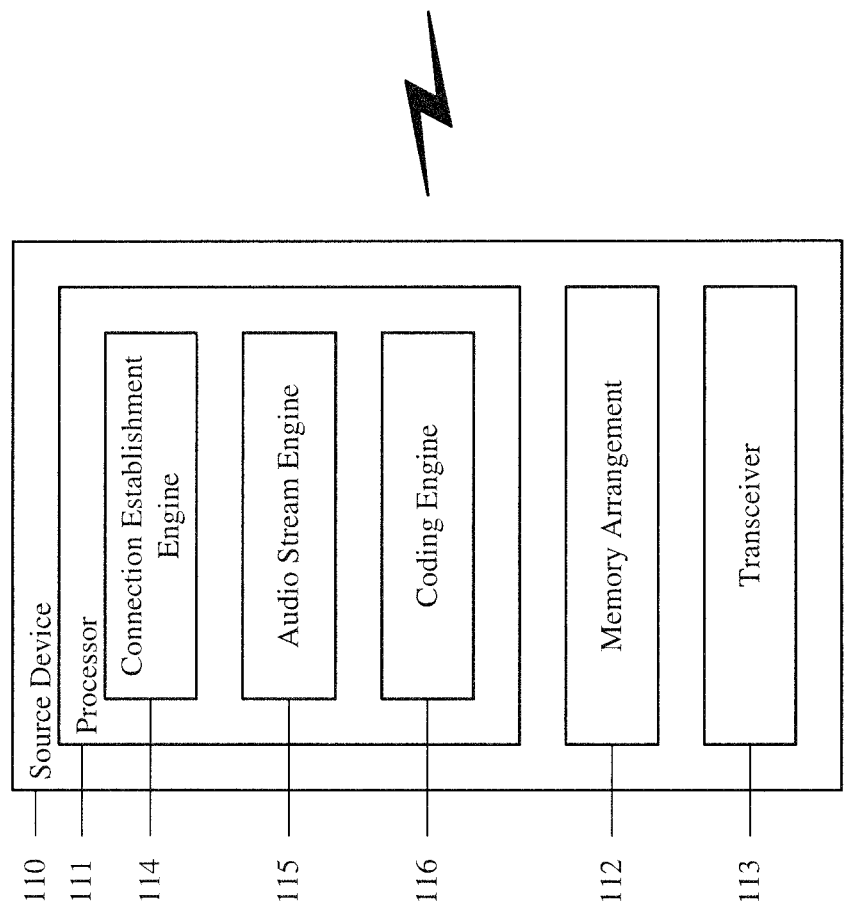

The exemplary embodiments may be further understood with reference to the following description and the related appended drawings, wherein like elements are provided with the same reference numerals. The exemplary embodiments describe a communication protocol that includes wideband access for low latency audio. For example, this exemplary communication protocol may deliver audio data from a first electronic device to a second electronic device at a low latency.

Initially, the exemplary embodiments are described with regard to a signaling exchange between a source device and a sink device. Throughout this description, the term source device refers to an electronic device that transmits audio data to another electronic device. Further, the term sink device refers to an electronic device that receives audio data from another electronic device. For example, in a first exemplary arrangement the source device may be a mobile phone and the sink device may be wireless headphones. In a second exemplary arrangement, the source device may be a computer and the sink device may be a wireless speaker. In a third exemplary arrangement, the source device may be a digital media player and the sink device may be a wireless sound system. Any reference to either the source device or the sink device as a particular type of electronic device is merely provided for illustrative purposes. The exemplary embodiments may apply to any type of electronic device that is capable of transmitting and/or receiving in accordance with the exemplary communication protocol.

Further, the exemplary embodiments are described with regard to the source device and the sink device operating within the 5 GHz band and utilizing at least one of a plurality of 20 MHz channels within the 5 GHz band. The 5 GHz band is a shared transmission medium where a plurality of different devices utilizing a plurality of different communication protocols may utilize the band for communications. Accordingly, access to the 5 GHz band may implicate various regulations and/or standards. For instance, Listen-Before-Talk (LBT) and short control signaling may be implemented to access the 5 GHz spectrum. The exemplary communication protocol may satisfy these various regulations and/or standards. However, any reference to a particular regulation and/or standard is merely exemplary, the capabilities of a system utilizing the exemplary communication protocol are not limited to any particular regulation and/or standard. Further, reference to the 5 GHz band and a 20 MHz channel are merely provided for illustrative purposes. The exemplary embodiments may apply to any frequency band or spectrum and any corresponding channel within the band or spectrum.

The exemplary embodiments are described with regard to an audio stream being configured into a plurality of layers. In one exemplary scenario the plurality of layers may include an audio core and at least one additional layer. For example, the audio stream may be configured into seven layers (0-6) where layer 0 may represent the audio core. Successful delivery of the audio core to the sink device may allow the audio stream to be processed to at the sink device. Successful delivery of each additional layer increases the quality of the audio stream at the sink device relative to the audio core. The number of layers delivered to the sink device may be limited by the throughput and/or the latency bound. For example, successful delivery of layer 0 may use approximately 3.8 Megabits per second (Mbps). Successful delivery of each additional layer may use an additional 1.9 Mbps. Thus, successful delivery of layers 0-1 may use approximately 5.8 mbps, layers 0-2 approximately 7.7 Mbps, layers 0-3 approximately 9.6 Mbps, layers 0-5 approximately 11.5 Mbps, etc. In another exemplary scenario, the plurality of layers may include an audio core and each additional layer may be available for any retranmssisons. However, throughout this description, any reference to a particular number of layers, a particular bitrate or a particular throughput time (TPT) is merely provided for illustrative purposes. The exemplary embodiments may apply to any number of layers and any appropriate corresponding bitrate or TPT. Further, reference to the terms layer and audio core are also merely provided for illustrative purposes, other systems may refer to similar concepts by different names.

The source device and the sink device may participate in a signaling exchange that includes a plurality of frames. The exemplary embodiments are described with regard to a frame length that is approximately 1 millisecond (ms). Thus, during operation, over a period of 10 ms there may be 10 frames. However, reference to a frame length of approximately 1 ms is merely exemplary, a frame may be configured with any appropriate frame length.

The exemplary communication protocol may split a frame into a deterministic phase and an opportunistic phase. The deterministic phase may include a burst that is transmitted from the source device to the sink device and feedback that is transmitted from the sink device to the source device. These signals may be configured to be transmitted in accordance with a schedule and may be configured to have time-limited access to the 5 GHz band. Throughout this description, the term burst refers to the first signal containing audio data that is transmitted from the source device to the sink device in a frame. For example, the burst may include, in part, at least a portion of the audio core (layer 0). The feedback may include, in part, an acknowledgement (ACK) that indicates that the burst was successfully received by the sink device or a negative acknowledgement (NACK) that the burst was not successfully received by the sink device.

The transmission of a burst may be based on a schedule. In a first exemplary configuration, a schedule may be established where a burst is transmitted at the start of each frame for a plurality of frames. In a second exemplary configuration, a schedule may be established that includes a plurality of anchor points. Throughout this description an anchor point may refer to an instance where the source device is configured to transmit a burst to the sink device. Further, a burst may be configured with a duration that is based on a predetermined percentage of the frame length. For example, a burst may be configured to be 5% of the frame length. Thus, in an exemplary scenario where the frame length was configured to be 1 ms and the burst was configured to be 5% of the frame length, the burst would have a 50 microsecond (μs) duration. This predetermined duration may be configured to satisfy or otherwise comply with access requirements such as the European Telecommunication Standards Institute (ETSI) Short Control Signaling Transmissions. However, throughout this description reference to a burst occupying any particular duration of a frame is merely provided for illustrative purposes. The exemplary embodiments may apply to a burst of any appropriate duration.

Since the transmission of a burst may be configured to occur at a known time for a known duration, the sink device may schedule the transmission of feedback subsequent to the transmission of a burst. Consider an exemplary scenario where a burst is configured to be transmitted at time (T) with a predetermined duration of 50 μs. Accordingly, the sink device may be configured to determine whether a burst was successfully received at T+50 μs. If the sink device determines that a burst was not successfully received, the sink device may transmit a NACK to the source device. Alternatively, if the sink device determines that a burst was successfully received substantially at T+50 μs, the sink device may transmit an ACK to the source device.

The opportunistic phase may occur subsequent to the deterministic phase and prior to the end of the frame. The opportunistic phase may include filler transmitted from the source device to the sink device. Throughout this description, the term filler refers to one or more second signals containing audio and/or other data that is transmitted from the source device to the sink device in a frame after the burst. The filler may include, in part, audio residuals. Throughout this description the term audio residuals may refer to any of the layers of the audio stream that were not included within the preceding burst. The audio residuals may correspond to either the current frame or any of the previous frames. For example, if an audio stream is configured into seven layers (0-6) and the entirety of layer 0 was included within a burst, the filler may include the remaining layers 1-6.

FIG. 1 shows an exemplary system 100 where a source device 110 exchanges data with a sink device 120 according to various exemplary embodiments. The system 100 includes a source device 110 that communicates with a sink device 120. The source device 110 may be any type of electronic component configured to communicate with and deliver audio data to another electronic component via a wireless connection. For instance, the source device 110 may be a mobile phone, a digital media player, a tablet computer, a desktop computer, a smartphone, a phablet, an embedded device, a wearable, an Internet of Things (IoT) device, a Cat-M device, a Cat-M1 device, a MTC device, an eMTC device, a television, a video game console, a set top box, a micro console, an access point, an eNodeB, a HeNBs, an eNB, a gNB, a gNodeB, a macrocell, a microcell, a small cell, a femtocell, etc. The sink device 120 may be any type of electronic component configured to communicate with and receive audio data from another electronic component via the wireless connection. For instance, the sink device 120 may be a mobile phone, a wireless earpiece, wireless headphones, a wireless headset, a wireless sound system, a wireless speaker, an automobile sound system, a wireless display screen, an audio/video adapter, etc.

The source device 110 and the sink device 120 may exchange data for a plurality of different functionalities (e.g., audio streaming, video streaming). Accordingly, the source device 110 and the sink device 120 may include components that enable this data exchange to be performed in a manner consistent with the mechanisms according to the exemplary embodiments. As shown in FIG. 1, the source device 110 may include a processor 111, a memory arrangement 112, and a transceiver 113. The source device 110 may also include further components such as a display device, an input/output (I/O) device, and other components such as a portable power supply, an audio I/O device, etc. The sink device 120 may also include substantially similar components such as a processor 121, a memory arrangement 122, and a transceiver 123 as well as the other components.

The processors 111, 121 may be configured to execute a plurality of engines of the source device 110 and the sink device 120, respectively. For example, the engines executed by the processor 111 may include a connection establishment engine 114, an audio stream engine 115 and a coding engine 116. The connection establishment engine 114 may be configured to establish a wireless communication link between the source device 110 and the sink device 120 in accordance with the exemplary communication protocol. This communication link may be a peer-to-peer connection or any other suitable type of connection that enables direct communication between the source device 110 and the sink device 120. Establishing the wireless communication link may include operations such as, but not limited to, broadcasting a particular signal that enables the sink device 120 to detect the source device 110, tuning the transceiver 113 to listen for a particular signal broadcasted by the sink device 120 to detect the sink device 120, performing a signaling exchange with the sink device 120 over a different communication protocol (e.g. Bluetooth, WiFi, etc.) that is configured to establish a connection that utilizes the exemplary communication protocol, configuring a schedule that indicates when a burst is to be transmitted, configuring time synchronization between the source device 110 and the sink device 120 or any other operation that enables the source device 110 and the sink device 120 to establish a wireless communication link and communicate in accordance with the exemplary protocol. The audio stream engine 115 may be configured to generate and/or process the audio data that is to be transmitted to the sink device 120. The coding engine 116 may be configured to encode the data that is to be transmitted to the sink device 120. For example, the coding engine 116 may apply unequal error protection (UEP) to the layers of the audio stream.

The engines executed by the processor 121 may include a connection establishment engine 124, validity engine 125 and an output engine 126. The connection establishment engine 124 may be configured to perform operations that are similar to the operations performed by the connection establishment engine 114. The validity engine 125 may be configured to determine whether audio data is properly received. The output engine 126 may be configured to receive and process the audio data to generate the corresponding output at the sink device 120.

The above engines each being an application (e.g., a program) executed by the processors 111, 121 is only exemplary. The functionality associated with the engines may also be represented as a separate incorporated component of the source device 110 or the sink device 120 or may be a modular component coupled to the source device 110 or the sink device 120, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. In addition, in some devices, the functionality described for the processors 111, 121 may be split among two or more processors such as a baseband processor and an applications processor. The exemplary embodiments may be implemented in any of these or other configurations of a device.

The memory arrangements 112, 122 may be a hardware component configured to store data related to operations performed by the source device 110 and the sink device 120, respectively. For example, the memory arrangement 112 may store information associated with data to be transmitted and coding algorithms that maybe applied. In another example, the memory arrangement 122 may store information associated with data that is received which is subsequently processed. The transceivers 113, 123 may be a component of the source device 110 and the sink device 120, respectively, that enables communication with other devices via a plurality of different communication protocols. In this example, the transceivers 113, 123 may enable communication between the source device 110 and the sink device 120 in accordance with the exemplary communication protocol. The transceivers 113, 123 may therefore be equipped with a radio configured to perform communications that adhere to the exemplary communication protocol.

As mentioned above, the exemplary embodiments relate to a source device 110 and a sink device 120 that operate according to the exemplary communication protocol. The exemplary communication protocol may be based on wideband communication. For instance, the source device 110 and the sink device 120 may operate within the 5 GHz band (e.g. 5.150-5.875 GHZ). The 5 GHz band may include a plurality of 20 MHz channels. The source device 110 and the sink device 120 may utilize at least one of the plurality of 20 MHz channels for communication. Further, the exemplary communication protocol may incorporate orthogonal frequency division multiplexing (OFDM). Thus, the signals exchanged between the source device 110 and the sink device 120 may be based on OFDM symbols and subcarriers. However, the exemplary communication protocol may utilize any appropriate modulation scheme.

The exemplary communication protocol may include the source device 110 and the sink device 120 establishing a connection. The connection may be a peer-to-peer connection or any other suitable connection that enables direct communication between the source device 110 and the sink device 120. The connection may be established in any suitable manner. In a first exemplary configuration, the source device 110 may broadcast control information or any other suitable type of information that enables to sink device 120 to detect the presence of the source device 110. The sink device 120 may detect the source device 110 by tuning its transceiver 123 to a particular frequency at a particular time. This broadcasted information may enable the source device 110 and the sink device 120 to perform further communication and associate with one another. Alternatively, the sink device 120 may broadcast the appropriate information and the source device 110 may tune its transceiver 113 to a particular frequency at a particular time to detect the presence of sink device 120. In a second exemplary embodiment, the source device 110 and the sink device 120 may exchange the information necessary to establish a connection in accordance with the exemplary communication protocol near-field communication (NFC). In a third exemplary configuration, the source device 110 and the sink device 120 may communicate in accordance with a different communication protocol (Bluetooth, WiFi, LTE, 5G, etc.) and exchange the information needed to establish a connection in accordance with the exemplary communication protocol. The exemplary configurations described above are merely provided for illustrative purposes, a connection that is based on the exemplary communication protocol may be established in any appropriate manner.

Either during or subsequent to the establishment of the connection, the source device 110 and the sink device 120 may establish time synchronization and a schedule that includes a plurality of frames. Each frame may be configured to have a frame length of approximately 1 ms. To increase the amount of bandwidth available for communication between the source device 110 and the sink device 120 at a particular instance, the exemplary communication protocol may incorporate channel bonding on a per-frame basis. Channel bonding may include combining a plurality of channels for increased throughput. Thus, the amount of bandwidth available to the source device 110 and the sink device 120 may be based on the number of channels available within the 5 GHz band during each particular frame. To further increase the bandwidth available for communication between the source device 110 and the sink device 120 at a particular instance, the exemplary communication protocol may incorporate a plurality of spatial streams. A spatial stream is an independent signal and the number of spatial streams available may be based on the number of antennas. The source device 110 and the sink device 120 may coordinate the channels to be utilized and the number of spatial streams during the establishment of the connection or by exchanging control information subsequent to the establishment of the connection.

Each frame may be configured with two phases, a deterministic phase and an opportunistic phase. The deterministic phase may include the burst that is transmitted from the source device 110 to the sink device 120 and feedback that is transmitted from the sink device 120 to the source device 110. These signals may be transmitted in accordance with a schedule and without determining whether the channel the signal (e.g. burst, feedback) is to be transmitted over is occupied. For instance, the schedule may establish a plurality of anchor points which provides the source device 110 an opportunity to transmit a burst and may indicate the beginning of a frame.

To comply with various regulation and/or standards, access to the 5 GHz band that is not preceded by determining whether the channel is occupied may be time-limited. For instance, short control signaling may limit the number of these types of transmissions within a particular duration and/or the total transmission time within the particular duration. Further, regardless of whether access requirements are applicable in a particular scenario, the predetermined duration of the bursts may be configured to ensure that the transmission medium is available for other communications. This may allow other devices utilizing the medium to maintain a satisfactory user experience and/or performance. This may also allow the source device 110 and/or the sink device 120 to execute other operations that may utilize the shared medium. The exemplary communication protocol may schedule delivery of a burst on a per-frame basis. This may allow the delivery of the audio core from the source device 110 to the sink device 120 at a low latency (1-2 ms).

The opportunistic phase may include filler that is transmitted from the source device 110 to the sink device 120. This transmission may be preceded by determining whether the channel is occupied by other transmissions. For instance, the source device 110 may perform clear channel assessment (CCA). If the CCA identifies that the channel is busy, the source device 110 may delay the transmission of the filler. The length of delay may be based on a predetermined duration, identifying a predetermined condition, statistics, an algorithm, a look up table or a combination thereof. The filler is not required to be successfully delivered on a per-frame basis because the audio core corresponding to the particular frame is likely successfully delivered in the preceding deterministic phase of the frame. Thus, the audio data that is used to process the audio stream at the sink device 120 has likely already been received. Alternatively, if the CCA identifies that the channel is not occupied, the source device 110 may initiate the transmission of the filler. The duration of the filler is limited by the length of the frame. As mentioned above, access to the 5 GHz band may implicate various regulations and/or standards. Accordingly, in one exemplary scenario, if the CCA indicates that the channel is not occupied, the source device 110 may implement a fixed delay, backoff and/or any other operation to satisfy any relevant regulation/standard prior to initiating the transmission of the filler. For example, the sink device 110 may perform particular operations to satisfy the requirements of the 802.11 access scheme prior to the transmission of the filler.

The exemplary communication protocol may implement an unequal protection (UEP) coding scheme. UEP is a Joint Source Channel Coding (JSCC) technique where different layers of an audio stream are coded with different coding rates. Here, the strongest code (e.g. lower code rate) is applied to the audio core (layer 0). The second lowest coding rate is applied to layer 1. The third lowest coding rate is applied to layer 3, etc. This ensures that the audio core has the highest chance of being successfully received by the sink device 120. The UEP may also provide the exemplary communication protocol with graceful degradation. Graceful degradation means that as pathloss increases there is no point where the audio quality suddenly and drastically drops but instead, the audio quality consistently decreases with pathloss. This may enable a user to move the sink device 120 relative to the source device 110 or vice versa without the reception of the audio stream at the sink device 120 suddenly terminating.

Figure 2:
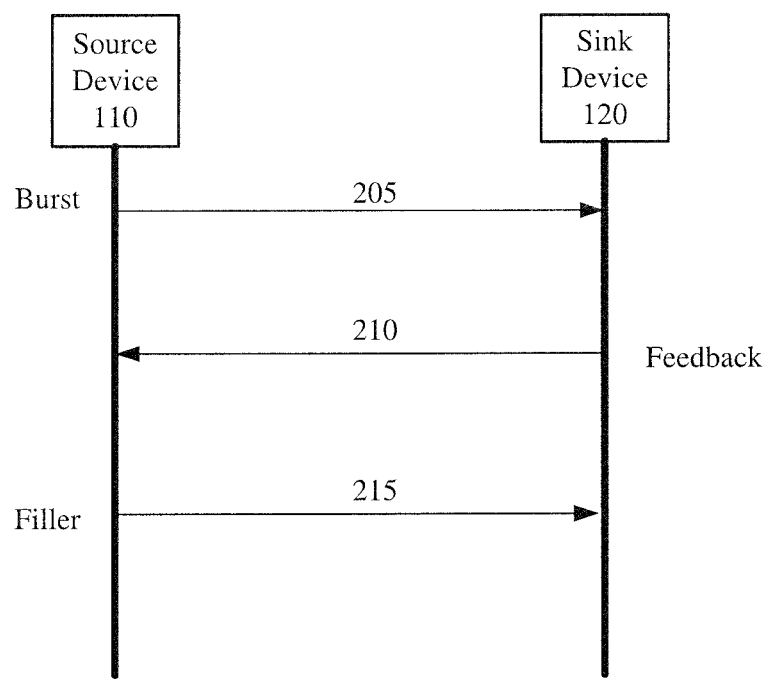
FIG. 2 shows an exemplary signaling diagram for a signaling exchange between the source device and the sink device according to various exemplary embodiments.

FIG. 2 shows an exemplary signaling diagram 200 for a signaling exchange between the source device 110 and the sink device 120 according to various exemplary embodiments. As discussed above, the exemplary communication protocol may schedule a frame and the frame may be configured with a deterministic phase and an opportunistic phase. Accordingly, the signaling diagram 200 represents a signaling exchange between the source device 110 and the sink device 120 that occurs during a frame after a connection between the source device 110 and the sink device 120 has been established. In this exemplary scenario, the connection between the source device 110 and the sink device 120 includes a single channel. The audio data to be transmitted from the source device 110 to the sink device 120 is separated into an audio core (layer 0) and at least one additional layer.

In 205, the source device 110 transmits a burst to the sink device 120. The transmission of the burst may be initiated in response to a scheduled anchor point. The burst may be configured to be a predetermined duration, the predetermined duration may provide the source device 110 with predictable access to the channel and thus, enable the delivery of audio data at a low latency (1-2 ms). As will be described below in FIG. 3, the burst may be configured to include control information, the audio core corresponding to the current frame, the audio core corresponding to the previous frame and audio residuals.

In 210, the sink device 120 transmits feedback to the source device 110. Since the transmission of the burst is configured to occur at a known time due to the anchor point, the sink device 120 may be provided an indication as to when the sink device 120 is to receive the burst from the source device 110. Accordingly, the sink device 120 may determine whether a burst has been received at a predetermined instance. If a burst is not received as scheduled, the sink device 120 may transmit a NACK to the source device 110 indicating to the source device 110 that the sink device has not successfully received the scheduled burst. This indication may concern unsuccessful reception of the entire burst or unsuccessful reception of portions of the burst. If the burst is received as scheduled, the sink device 120 may transmit an ACK to the source device 110 indicating to the source device 110 that the sink device 120 has successfully received the burst. The feedback may also include information regarding the channel. For instance, the feedback may include channel state information (CSI), an interference report, etc.

In 215, the source device 110 may transmit filler to the sink device 120. This transmission may be conditional since successful delivery of the audio core to the sink device 120 may be sufficient to process the audio stream at the sink device 120. As mentioned above, the audio core was included within the preceding burst 205. Thus, if the condition is not satisfied (e.g., the channel is not clear), the audio core is likely already delivered and thus, a satisfactory audio stream was already successfully delivered to the sink device 120. The condition may relate to whether the channel over which the filler is to delivered is occupied during the opportunistic phase of the frame. This may be determined based on CCA, spectrum sensing, a carrier sensing mechanism, information received from another device, statistics, measurements, or a combination thereof. If it is determined that the channel is unoccupied, the transmission of the filler may be initiated. The duration of the filler may be limited by the beginning of the next frame and/or a subsequently scheduled anchor point. If it is determined that the channel is occupied, the source device 110 may delay the transmission of the filler. The length of delay may be based on a predetermined duration, identifying a predetermined condition, statistics, an algorithm, a look up table, implicated regulations and/or standards or a combination thereof. As will be described below in FIG. 3, the filler may be configured to include control information, retransmissions and audio residuals.

Figure 3:
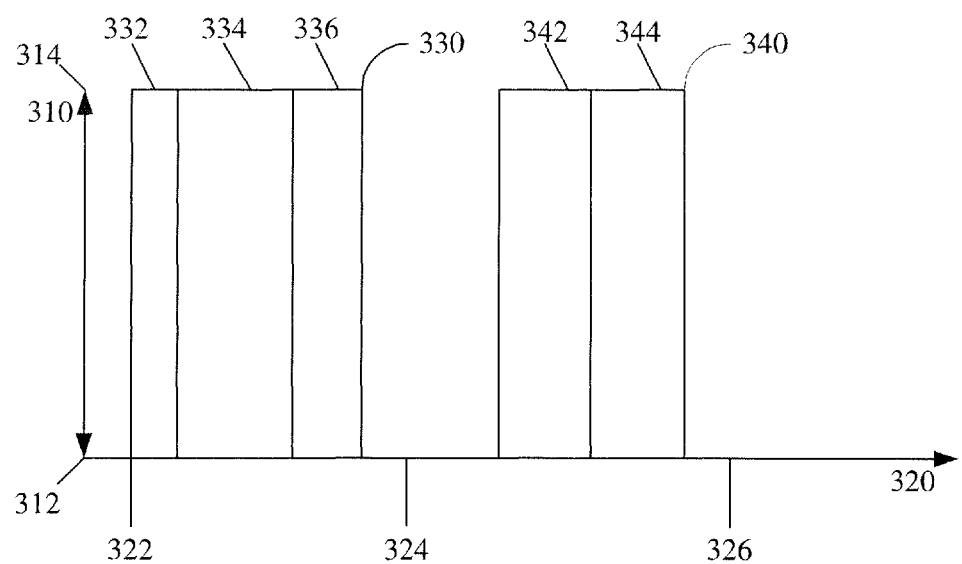
FIG. 3 shows an exemplary frame that includes the burst and the filler transmitted from the source device to the sink device according to various exemplary embodiments.

FIG. 3 shows an exemplary frame 300 that includes a burst and filler transmitted from the source device 110 to the sink device 120 according to various exemplary embodiments. During operation of the exemplary communication protocol, the source device 110 may be configured to transmit a burst during the deterministic phase of the frame 300 and filler during the opportunistic phase of the frame 300. The frame 300 will be described with regard to the system 100 of FIG. 1 and the signaling diagram 200 of FIG. 2.

The y-axis 310 represents frequency and the x-axis 320 represents time. The portion of the y-axis 310 between point 312 and point 314 represents the bandwidth of a channel. The point 322 on the x-axis 320 represents the start of the frame 300 and/or an anchor point and the point 326 on the x-axis 320 represents the end of the frame 300. The frame length of frame 300 may be approximately 1 ms or any other suitable duration. The portion of the x-axis 320 between the points 322 and 324 represents the deterministic phase of the frame 300 and the portion of the x-axis 320 between the points 324 and 326 represents the opportunistic phase of the frame 300. The duration of the deterministic phrase may be configured based on the predetermined duration of the burst and the configured duration of the feedback (not shown).

As mentioned above, the point 322 of the x-axis 320 represents the start of the frame 300. An anchor point may also be configured at point 322 of the x-axis 320. The anchor point may indicate when the burst 330 is to be transmitted from the source device 310 to the sink device 320.

The burst 330 may include a first portion 332, a second portion 334 and a third portion 336. The first portion 332 of the burst 330 may include control information. The control information may include a variety of different types of information. For instance, the control information may include information that enables the sink device 120 to process the payload data of the burst 330. The control information may also include information that facilitates coordination of subsequent communication between the source device 110 and the sink device 120. Exemplary types of information may include, but are not limited to, an indication of a modulation and coding scheme (MCS), an indication of a number of spatial streams, an indication of an OFDM structure, pilot symbols, the identity of the source device 110, the identity of the sink device 120, synchronization information and scheduling information, etc. The amount of control information within the burst 330 may vary and be as low as a single bit. Since the burst 330 may have a predetermined duration, the amount of control information included within the burst 330 impacts the amount of payload data (e.g. audio data) that may be included within the burst 330.

The burst 330 may be configured with a preamble. However, since the burst 330 may be configured with a predetermined duration, including a preamble may decrease the amount of payload data that may be included in the burst 330. Accordingly, the burst 330 may also be transmitted without a preamble. The lack of a preamble allows the source device 110 to maximize the amount of payload data that may be included within the burst 330. The sink device 120 may detect the presence of burst 330 when it is not configured with a preamble based on OFDM data pilot symbols included within the burst 330. These OFDM pilot symbols may also provide the basis for tracking various physical layer parameters. Thus, in one exemplary operation, the source device 110 may include a preamble in a subset of bursts transmitted to the sink device 120. Determining which burst may include a preamble may be based on a variety of different factors, including but not limited to, a schedule, the duration since the previous preamble and feedback received from the sink device 120.

The second portion 334 of the burst 330 may include an audio core. The exemplary communication protocol may enable a continuous audio stream to be delivered from the source device 110 to the sink device 120. Thus, the frame 300 may be one a plurality of frames between the source device 110 and the sink device 120 over a particular duration. Accordingly, since successful delivery of the audio core allows the sink device 120 to process the audio stream, each frame of the plurality of frames may be configured with a corresponding audio core to provide continuous audio over the particular duration. The second portion 334 of the burst 330 may include the audio core corresponding to the frame 300. The second portion 334 of the burst 330 may also include an audio core corresponding to a previous frame. For instance, consider an exemplary scenario where prior to the frame 300 a burst including an audio core was transmitted from the source device 110 to the sink device 120. However, for any one of a variety of different reasons, the sink device 120 may have not successfully received this previous audio core and may have indicated the unsuccessful reception of this previous audio core by transmitting a NACK to the source device 110. Thus, the source device 110 may include a retransmission of this previous audio core in the burst 330 to attempt to successfully deliver this previous audio core to the sink device 120.

The third portion 336 of the burst 330 may include audio residuals corresponding to the frame 300. While successful delivery of the audio core to the sink device 120 allows the audio stream to be processed, each additional layer of the audio stream provided to the sink device 120 may increase the audio quality. The amount of audio residuals included within the burst 330 may vary because the throughput required to deliver the audio core to the sink device 120 may vary and the amount of control information included within the burst 330 may vary. Thus, after the control information and the audio core is mapped within the predetermined duration of the burst 330, the source device 110 may include as much audio residuals as the bandwidth of the channel and the predetermined duration of the burst 330 permits.

Filler 340 may be transmitted to the sink device 120 during the opportunistic phase of the frame 300 (e.g., after point 324). The transmission of the filler 340 may be conditional. For instance, the source device 110 may determine, prior to the transmission of the filler 340, whether the channel is occupied. If the channel is occupied for the entirety of the opportunistic phase of the frame 300, the filler 340 may not be transmitted. If the channel is unoccupied for a portion of the opportunistic phase of the frame 300, the filler 340 may be transmitted during the unoccupied portion. The duration of the filler 340 may vary based on the duration in which the channel is unoccupied.

The filler 340 may include a first portion 342 and a second portion 344. The first portion 342 of the filler 340 may include a retransmission. For instance, if the source device 110 received a NACK corresponding to the burst 330 from the sink device 120, the source device 110 may include a retransmission of at least the audio core corresponding to the frame 300 that was included within the previously transmitted burst 330. If it is determined that the channel is occupied and the transmission of the filler 340 does not occur, as mentioned above, this retransmission may be included within a subsequent burst.

The second portion 344 of the filler 340 may include audio residuals. The audio residuals may correspond to the audio core transmitted during the frame 300 and/or may correspond to an audio core that was transmitted prior to the frame 300. The filler 340 may contain additional information. For instance, the filler 340 may employ a preamble. The preamble may enable the sink device 120 to detect the transmission of the filler 340 over the channel. The preamble may also enable training and tracking of various physical layer parameters during communication between the source device 110 and the sink device 120. These physical layer parameters may include but are not limited to, timing, carrier frequency offset (CFO) and automatic gain control (AGC).

The exemplary communication protocol may be capable of a plurality of different data rates. As mentioned above, to increase the bandwidth available for communication between the source device 110 and the sink device 120 channel bonding may be implemented on a per-frame basis. Thus, at any particular frame, the source device 110 and the sink device 120 may utilize a plurality of 20 MHz channels within the 5 GHz band. Accordingly, a burst may be transmitted over each available channel. Each spatial stream may be configured to utilize a maximum number of channels. For instance, a spatial stream may utilize four channels. However, four channels is merely exemplary, more channels may be utilized by incorporating dynamic frequency selection (DFS). Increasing the number of spatial streams may increase the number of channels available for communication between the source device 110 and the sink device 120. For instance, utilizing two spatial streams may make eight channels available for communication between the source device and the sink device. Accordingly, in this exemplary scenario, eight bursts may be transmitted during a frame.

The type of modulation scheme may also have an effect on the data rates. For instance, quadrature amplitude modulation (QAM) may be applied to the signals exchanged between the source device 110 and the sink device 120. There are a variety of different forms of QAM that may be utilized, including but not limited to, 8-QAM, 16-QAM, 32-QAM, 64-QAM, 128-QAM, 256-QAM, 512-QAM, 1024-QAM and 2048-QAM.

Figure 4:
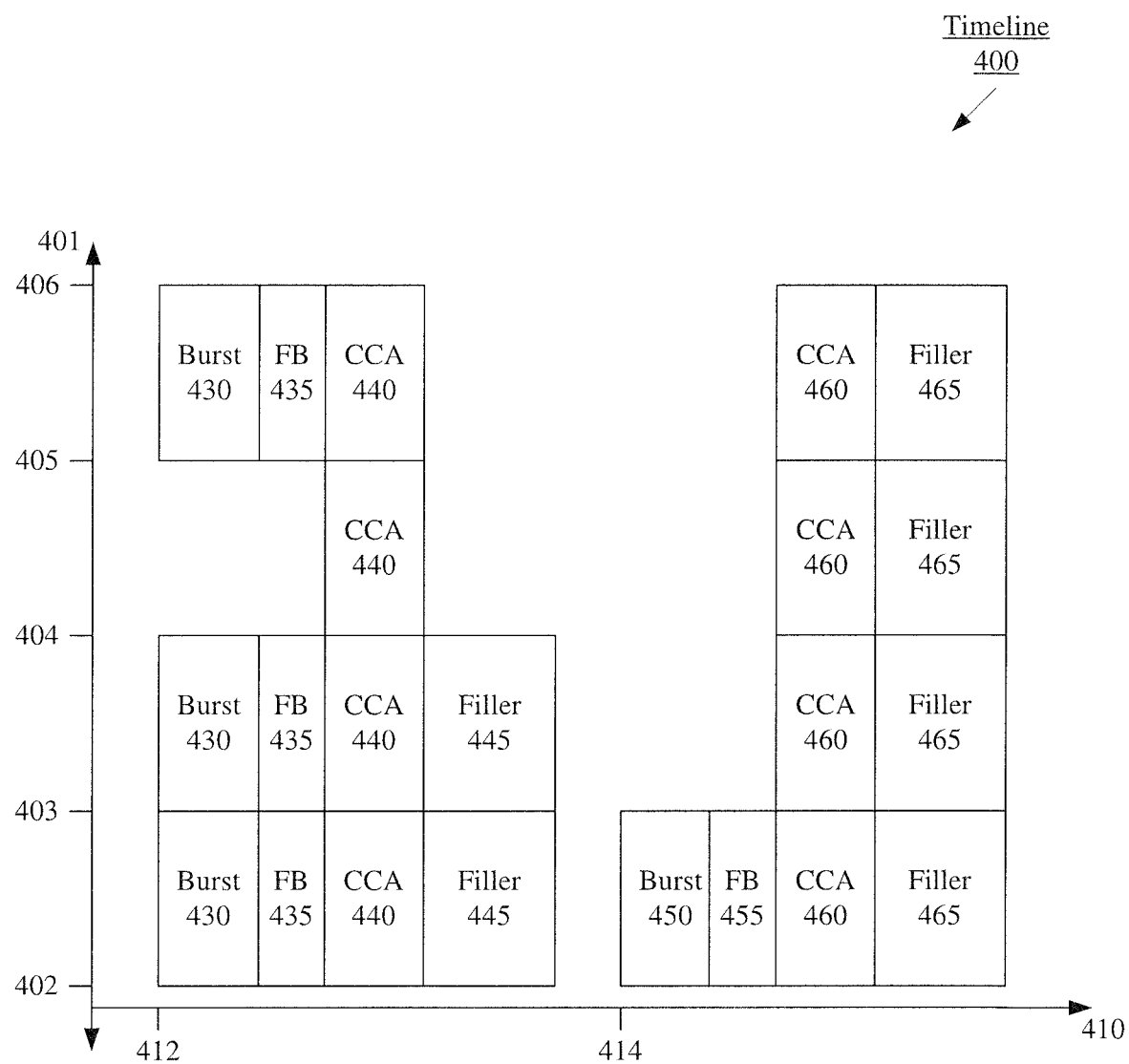
FIG. 4 shows an exemplary timeline of communications between the source device and the sink device according to various exemplary embodiments.

FIG. 4 shows an exemplary timeline 400 of communications between the source device 110 and the sink device 120 according to various exemplary embodiments. The timeline 400 will be described with regard to the system 100 of FIG. 1, the signaling diagram 200 of FIG. 2 and the frame 300 of FIG. 3.

The timeline 400 relates to communication between the source device 110 and the sink device 120 after a connection between the source device 110 and the sink device 120 has been established. Consider an exemplary scenario where the source device 110 is configured with a single spatial stream and the connection between the source device 110 includes channel bonding. Here, four 20 MHz channels within the 5 GHz band are available for communications between the source device 110 and the sink device 120, and the audio stream to be transmitted to the sink device 120 may be configured into, e.g., seven layers (0-6).

The y-axis 401 represents frequency and the x-axis 410 represents time. The portion of the y-axis between the points 402 and 403 represents the bandwidth of a first channel, the portion of the y-axis between points 403 and 404 represents a second channel, the portion of the y-axis between points 404 and 405 represents a third channel and the portion of the y-axis between points 405 and 406 represents a fourth channel. The point 412 on the x-axis 410 represents a first anchor point and the point 414 on the x-axis 410 represents a second anchor point. The anchor points 412 and 414 are instances where the source device 110 may be configured to initiate the transmission of audio data to the sink device 120.

Prior to the occurrence of the first anchor point, the source device 110 may determine whether each channel is occupied. This determination is not required, but may be implemented by the source device 110 as a courtesy to other communications that may be occupying the channels. The source device 110 may determine which channels to utilize for the transmission of a burst when the first anchor point occurs. Since channel bonding is available, each channel may be utilized to transmit a burst to the sink device 120. In this exemplary scenario, the source device 110 senses that the third channel between the points 404 and 405 is occupied. Thus, in this exemplary scenario, the source device 110 determines that the first channel, the second channel and the fourth channel are to be utilized to transmit a burst to the sink device 120 when the anchor point 412 occurs. As mentioned above, this occupancy determination is not required. Due to the predetermined duration of the bursts, access to the channel is guaranteed and thus, a burst may be transmitted over each channel regardless of whether the channel is occupied.

Subsequent to the first anchor point 412, the burst 430 may be transmitted over the first channel, the second channel and the fourth channel. In this exemplary scenario, layers (0-3) of the audio stream were included within the burst 430. Further, in this exemplary scenario, the burst 430 includes OFDM pilot symbols. The sink device 120 may detect the presence of the burst 430 based on the OFDM pilot symbols.

Upon successful detection, the sink device 120 may perform a validity check. This validity check may include decoding the burst 430 and chaining the data received over the first, second and fourth channels. Subsequently, this data will be delivered to the medium access control (MAC) layer of the sink device 120. At the MAC layer validation checksums may be performed on the data for error detection and correction. This type of validity check is merely exemplary, other operations may be performed for error detection and correction such as a cyclical redundancy check (CRC).

Subsequent to the transmission of the burst 430, the sink device 120 may transmit feedback 435 to the source device 110 over each channel that was utilized to transmit the burst 430 to the sink device 120. The feedback 435 may indicate whether the burst was successfully received over the corresponding channel. In this exemplary scenario, the feedback 435 may include ACKs for all channels indicating that layers 0-3 of the audio stream were successfully received by the sink device 420.

Subsequent to the transmission of the feedback 435, the source device 110 may perform CCA 440 on each of the channels to determine whether each channel is occupied. If the source device 110 determines that a channel is unoccupied, the source device may utilize that channel for the transmission of filler 445. A channel may be used to transmit the filler 445 regardless of whether the channel was previously utilized to transmit the burst 430. As mentioned above, since these channels are a shared transmission medium the source device 110 may be required to perform CCA 440 or another similar operation to satisfy access requirements.

In this exemplary scenario, since layers 0-3 of the audio stream were successfully delivered to the sink device 120 during the burst 430, the source device 110 only has layers 4-6 to deliver to the source device 120 via the filler 445. Further, in this exemplary scenario, CCA 440 indicated that the first channel and the second channel are idle and may be utilized to deliver the filler 445 to the sink device 120. Accordingly, the source device 110 utilizes the first channel and the second channel to deliver the filler containing the remaining layers 4-6 to the sink device 120. The amount of bandwidth available for the filler 430 is based on the channel, CCA, the length of the delay subsequent to the CCA and the beginning of the subsequent frame.

Prior to the second anchor point 414, the source device 110 may again determine whether the channels are occupied. In this exemplary scenario, the source device 110 determines that only the first channel is unoccupied. Accordingly, the source device 110 determines to utilize the first channel for the transmission of the burst 450. In this exemplary scenario, the burst 450 includes layers 0-1. As mentioned above, determining whether a channel is occupied prior to the transmission of the burst 450 is not required and is merely implemented as a courtesy to the other communications that may be occupying the channel. Accordingly, if the source device 110 had determined that all four channels were occupied, the source device 110 may transmit the burst 450 over any or all of the channels since the predetermined duration of the burst provides guaranteed access to the medium.

Subsequent to the transmission of the burst 450, the sink device 120 transmits feedback 455 to the source device 110 over the first channel indicating whether the sink device 120 successfully received the burst 450. In this exemplary scenario, the feedback 455 included an ACK indicating that the burst 430 including layers 0-1 was successfully received by the sink device 120.

Subsequent to the transmission of the feedback 455, the source device 110 may perform CCA 460 on each of the channels to determine which channel may be utilized for the transmission of filler 465. In this exemplary scenario, the CCA 460 indicates that all four channels are available for the transmission of the filler 465.

In this exemplary scenario, since layers 0-1 of the audio stream were successfully delivered to the sink device 120 during the burst 450, the source device 110 only has layers 2-6 to deliver to the source device 120 via the filler 465. However, the bandwidth available over the four channels may only be enough to transmit layers 2-5 in the filler 465. Accordingly, the source device 110 transmits that filler 465 containing layers 2-5 over the first channel, the second channel, the third channel and the fourth channel to the sink device 120. The remaining layer 6 may be transmitted to the sink device 120 in a subsequent frame or may be omitted since the audio core (layer 0) may be used process the audio stream at the sink device 120.

Devices utilizing the exemplary communication protocol may implement various mechanisms to avoid causing interference with other communications. For instance, a first pair of devices utilizing the exemplary communication protocol may communicate with a second pair of devices utilizing the exemplary communication protocol. This coordination communication may occur in any appropriate manner and may enable the first pair of devices and the second pair of devices to establish anchor points at different times to avoid interference with each other when utilizing the exemplary communication protocol to communicate over the same transmission medium. If it is determined that the current configuration of anchor points is causing interference between the first pair of devices and the second pair of devices, either the first pair of devices or the second pair of devices may shift one or a plurality of subsequent anchor points.

In one exemplary scenario, the source device 110 may gradually shift a plurality of anchor points over time. Shifting the plurality of anchor points may be based on explicit coordination with the sink device 120. Alternatively, the source device 110 may not explicitly coordinate with the sink device 120 and instead, the sink device 120 may identify that the anchor point has shifted. In response to identifying the shift, the sink device 120 configures its transceiver 120 to listen for a burst from the source device 110 at an instance that is subsequent to the scheduled anchor point in an attempt to match the shifted anchor point. The sink device 120 may repeat this process and gradually shift its anchor point until the sink device 120 configures its transceiver 123 to listen for a burst from the source device 110 matches the anchor point set by the source device 110. Shifting an anchor point based on identifying interference is merely exemplary. Shifting an anchor point may be implemented as a preventative measure against the possible occurrence of interference, based on predicting the occurrence of interference, a timer, a number of transmissions between the source device 110 and the sink device 120 or any combination thereof.

A device that is communicating in accordance with the exemplary communication protocol, may also be communicating over another communication link in accordance with a different communication protocol. In this exemplary scenario, if a burst occurs during the reception of data over the different communication protocol, the device may determine to suspend the reception of the data over the different communication protocol and resume the reception of the data over the different communication protocol after the burst is complete. By prioritizing the burst over the reception of the data over the different communication protocol the quality and low latency of delivering the audio stream in accordance with the exemplary communication protocol is maintained. However, this exemplary scenario is merely provided for illustrative purposes, the exemplary embodiments may coordinate between the exemplary communication protocol and a different communication protocol in any appropriate manner.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a source device:
establishing a wireless communication link comprising a plurality of channels with a sink device, wherein a protocol for communicating via the wireless communication link includes a frame having a first deterministic portion and a second opportunistic portion;
transmitting, during the first deterministic portion of the frame, first data to the sink device, wherein the first deterministic portion comprising the first data is transmitted simultaneously via two or more of the plurality of channels and the first data transmitted in each channel comprises an identical amount of audio data;
determining, after transmitting the first data during the first deterministic portion of the frame, whether a predetermined condition associated with the wireless communication link is satisfied, wherein the predetermined condition comprises determining whether a channel is not occupied during the second opportunistic portion of the frame; and
when the predetermined condition is satisfied, transmitting, during the second opportunistic portion of the frame, second data to the sink device.

2. The method of claim 1, wherein the first data and the second data comprise audio data that has a plurality of layers.

3. The method of claim 2, wherein the first data comprises at least a core layer of the audio data, wherein the sink device can process and output the audio data using the core layer.

4. The method of claim 2, wherein the second data comprises at least one layer of the audio data that was not transmitted during the first deterministic portion or a retransmission corresponding to the first deterministic portion.

5. The method of claim 1, further comprising:
receiving feedback corresponding to the first data from the sink device during the first deterministic portion, wherein the feedback indicates whether the first data was successfully received by the sink device.

6. The method of claim 5, further comprising:
retransmitting, when the feedback indicates that the first data was not successfully received by the sink device, the first data to the sink device during the second opportunistic portion.

7. The method of claim 5, further comprising:
retransmitting, when the feedback indicates that the first data was not successfully received by the sink device and when the predetermined condition is not satisfied, the first audio to the sink device during a further first deterministic portion of a subsequent frame.

8. The method of claim 1, wherein the plurality of channels are within a 5 GHz band.

9. The method of claim 1, further comprising:
determining, prior to transmitting the first data, that the two or more of the plurality of channels are unoccupied.

10. The method of claim 1, wherein the predetermined condition is further based at least in part on a predetermined duration.

11. The method of claim 1, further comprising:
receiving, from the sink device, a communication related to the first data, wherein the communication is received after transmitting the first data and before transmitting the second data.

12. A source device, comprising:
a transceiver configured to establish a wireless communication link comprising a plurality of channels with a sink device, wherein a protocol for communicating via the wireless communication link includes a frame having a first deterministic portion and a second opportunistic portion; and
a processor configured to:
transmit, during the first deterministic portion of the frame, first data to the sink device, wherein the first deterministic portion comprising the first data is transmitted simultaneously via two or more of the plurality of channels and the first data transmitted in each channel comprises an identical amount of audio data,
determine, after transmitting the first data during the first deterministic portion of the frame, whether a predetermined condition associated with the wireless communication link is satisfied, wherein the predetermined condition comprises determining whether a channel is not occupied during the second opportunistic portion of the frame; and,
when the predetermined condition is satisfied, transmit, during the second opportunistic portion of the frame, second data to the sink device.

13. The source device of claim 12, wherein the first data and the second data comprise audio data that has a plurality of layers.

14. The source device of claim 13, wherein unequal error protection is applied to the plurality of layers.

15. The source device of claim 13, wherein the first data comprises a core layer of the audio data, wherein the sink device can process and output the audio data using the core layer.

16. The source device of claim 12, wherein the processor is further configured to receive feedback indicating whether the sink device successfully received the first data.

17. The source device of claim 16, wherein the processor is further configured to:

retransmit, when the feedback indicates that the first data was not successfully received by the sink device, the first data to the sink device during the second opportunistic portion.

18. An integrated circuit comprising:

circuitry configured to establish a wireless communication link comprising a plurality of channels with a sink device, wherein a protocol for communicating via the wireless communication link defines a frame having a first deterministic portion and a second opportunistic portion;

circuitry configured to transmit, during the first deterministic portion of the frame, first data to the sink device, wherein the first deterministic portion comprising the first data is transmitted simultaneously via two or more of the plurality of channels and the first data transmitted in each channel comprises an identical amount of audio data;

circuitry configured to determine, after transmitting the first data during the first deterministic portion of the frame, whether a predetermined condition associated with the wireless communication link is satisfied, wherein the predetermined condition comprises determining whether a channel is not occupied during the second opportunistic portion of the frame; and circuitry configured to transmit second data to the sink device during the opportunistic portion of the frame when the predetermined condition is satisfied.

19. The method of claim 1, wherein the second deterministic portion of the frame is transmitted on a channel different from the channel that the first deterministic portion of the frame was transmitted.

* * * * *

UNITED STATES PATENT AND TRADEMARK OFFICE
CERTIFICATE OF CORRECTION

PATENT NO. : 11,523,449 B2
APPLICATION NO. : 16/144245
DATED : December 6, 2022
INVENTOR(S) : Sudak et al.

It is certified that error appears in the above-identified patent and that said Letters Patent is hereby corrected as shown below:

In the Claims

Claim 1, Column 15, Line 56:
"frame, second data to the sink device." should read as "frame, second data to the sink device, wherein the second data does not include any layers of audio data included in the first data."

Claim 12, Column 16, Line 55:
"second data to the sink device." should read as "second data to the sink device, wherein the second data does not include any layers of audio data included in the first data."

Claim 18, Column 18, Line 13:
"when the predetermined condition is satisfied." should read as "when the predetermined condition is satisfied, wherein the second data does not include any layers of audio data included in the first data."

Signed and Sealed this
Thirty-first Day of January, 2023

Katherine Kelly Vidal
*Director of the United States Patent and Trademark Office*